United States Patent [19]
Mize

[11] 3,766,894
[45] Oct. 23, 1973

[54] TWO CYCLE INTERNAL COMBUSTION ENGINE WITH SEQUENTIAL OPENING AND CLOSING OF EXHAUST AND INTAKE PORTS

[76] Inventor: Lawrence A. Mize, 161 Minorca Way, Millbrae, Calif. 94030

[22] Filed: Mar. 22, 1971

[21] Appl. No.: 126,748

[52] U.S. Cl. .............................. 123/53 B, 123/53 R
[51] Int. Cl. ........................................... F02b 25/12
[58] Field of Search ..................... 123/53 B, 53 R

[56] References Cited
UNITED STATES PATENTS

| 1,523,341 | 1/1925 | Della-Ferrera | 123/53 B |
| 1,656,581 | 1/1928 | Hanocq | 123/53 B |

FOREIGN PATENTS OR APPLICATIONS

| 1,196,479 | 5/1959 | France | 123/53 B |
| 650,238 | 9/1937 | Germany | 123/53 B |
| 732,374 | 3/1943 | Germany | 123/53 B |
| 878,878 | 6/1953 | Germany | 123/53 B |

*Primary Examiner*—Wendell E. Burns
*Attorney*—Townsend & Townsend

[57] ABSTRACT

A two cycle engine having dual pistons in which the pistons arrive at their top dead center substantially simultaneously. Individual chambers of the cylinder for the pistons are inclined with respect to each other at an angle of between about 25° to about 45°. Crank shaft throw arms for the pistons are aligned, they have a pitch diameter no greater than the piston diameter to assure a short stroke and the connecting rods are relatively short so that the bottom dead centers of the two pistons are spaced apart by about 35° to 45°. The short rods are dished in on one side to prevent interference with the cylinder walls. The piston leading the other one during operation of the engine opens and closes the exhaust port of the cylinder while the trailing piston opens and closes the intake port. During a complete operating cycle of the engine the exhaust port is first opened, then the intake port is opened, thereafter the exhaust port is closed and lastly the intake port is closed.

11 Claims, 7 Drawing Figures

PATENTED OCT 23 1973 3,766,894

INVENTOR.
LAWRENCE A. MIZE
BY Townsend and Townsend
ATTORNEYS

INVENTOR.
LAWRENCE A. MIZE
BY Townsend and Townsend
ATTORNEYS

# TWO CYCLE INTERNAL COMBUSTION ENGINE WITH SEQUENTIAL OPENING AND CLOSING OF EXHAUST AND INTAKE PORTS

BACKGROUND OF THE INVENTION

Two cycle internal combustion engines are relatively inexpensive to construct but have inherent problems resulting from valving difficulties, that is problems in adequately controlling the opening and closing of exhaust and intake ports. This results from the fact that the engine piston opens and closes the intake and exhaust ports.

The exhaust port must open before the intake port can be opened to permit a discharge of the combusted, pressurized fuel-air mixture before fresh mixture is charged into the cylinder. In normal two cycle engines the exhaust port is therefore closed after the intake port since both are controlled by the moving piston. As a result, fresh mixture can and normally does escape through the exhaust port without combustion. This entails a reduction in the engine efficiency and discharges a substantial number of pollutants. These are highly undesirable side effects. Additionally, conventional prior art two cycle internal combustion engines cannot be super charged, that is the pressure of the fuel-air mixture introduced into the chamber cannot be increased above atmospheric pressures since it could pass through the exhaust port out of the cylinder unless special, expensive auxiliary valves are employed. The construction of high power, high performance two cycle engines without such valves is therefore not possible.

Economic two cycle engine manufacture and operation make it mandatory that the intake and exhaust ports be opened and closed by the pistons. To overcome the aforementioned shortcomings, attempts have been made to open the exhaust port first, then open the intake port, and to thereafter close the exhaust and intake ports simultaneously or spaced in time so that either one or the other closes first. If the intake port closes last the cylinder can be charged with fresh mixture without a substantial part of the mixture escaping through the exhaust port. U.S. Pat. No. 1,523,341 illustrates such an attempt.

In that patent, each cylinder has two interconnected chambers in which a pair of pistons operate. The chambers are angularly inclined with respect to the vertical by about 7 ½° and with respect to each other by about 15°. In operation, one of the cylinders leads while the other one trails while both arrive at their top dead centers substantially simultaneously so that the ignition of the fuel-air mixture in the cylinder results in a simultaneous power stroke for both pistons. Their bottom dead centers are spaced apart, by about 8°, so that there are a leading and a trailing piston.

Each cylinder chamber is provided with one port. The leading piston chamber defines the exhaust port and the trailing piston chamber, the intake port. As a result of the phase shift in the movement of the two pistons, the exhaust port is opened before the intake port is opened and, depending on its position on the cylinder, it can be closed before, after or simultaneously with the closing of the intake port. Charging of the cylinders with fresh mixture while the exhaust port is closed is thus theoretically possible.

Although the above referenced U.S. Patent is an improvement over earlier two cycle engines, it was incapable of achieving ideal timing for the opening and closing of the exhaust and intake ports. Ideally, about one-third (⅓) or 120° of each engine cycle is taken up by the compression stroke and the power stroke which follow each other and terminate and begin, respectively, at top dead center of the engine. The remaining one-third (⅓) or 120° of the cycle symetrically extends to each side of the engine's bottom dead center and comprises the cycle portion during which combusted gases are exhausted and fresh fuel-air mixture is charged into the cylinder. In prior art engines, the exhaust port remains open for substantially the full duration of the exhaust and intake stroke cycle portion while the intake port remains open for a shorter period of time which commences after the opening of the exhaust port and terminates prior to the closing of the exhaust port.

In the two cycle engine of the above referenced U. S. patent, the relative timing of the opening and closing of the exhaust and intake ports could be more beneficially adjusted than in earlier prior art two cycle engines. It became possible to open the exhaust ports as much as about 10° to 15° prior to the opening of the intake ports while closing the intake port at least simultaneously with the exhaust port. By sacrificing part or all of the earlier opening of the exhaust port it becomes possible to close the intake port as much as 10° to 15° subsequent to the closing of the exhaust port. However, for ideal timing the exhaust port should open 30° to 45° before the opening of the exhaust port and should likewise close 30° to 45° before the closing of the intake port.

The above described ideal timing conditions could not be attained with the engine disclosed in said U.S. patent because of space limitations within the engine, the long piston stroke, the necessary long connecting rod and the resulting relatively minor spacing of no more than about 8° between the bottom dead center of the pistons. A shortening of the connecting rod to increase the bottom dead center spacing of the pistons was not possible because of an ensuing interference between the inclined cylinder walls and the connecting rods. Consequently, though improvements in the construction of prior art two cycle internal combustion engines have been made, ideal timing and particularly ideal valving conditions, have heretofore not been attainable.

SUMMARY OF THE INVENTION

The present invention provides a two cycle internal combustion engine in which the exhaust and intake periods overlap but are staggered to obtain substantially ideal valving conditions. Briefly, the engine of the present invention comprises a pair of short stroke, coacting pistons disposed in interconnecting chambers of a cylinder. The pistons have diameters at least about equal to their stroke to provide space for connecting the pistons with the throw of the crank shaft without interference between connecting rods and cylinder walls. Each chamber includes a port leading to the exterior. The crank shaft throws for the pistons are aligned so that the pistons are substantially simultaneously at their top dead center. The chambers are angularly inclined with respect to each other a sufficient amount so that one of the pistons leads the other one during operation of the engine and opens the port forming the exhaust before the other piston opens the other port forming the intake. The one piston thereby closes the exhaust port substantially earlier than the other piston closes the intake port.

The angular inclination between the cylinder chambers is between about 25° to 45°. The connecting rods have a length in the range of between about 1.4 to about 2.1, and preferably about 1.7 times the piston diameter. Sufficient phase shifting in the piston travel is then obtained so that their bottom dead centers are spaced apart about 30° to about 45° of one crank shaft rotation. With such an engine, it is possible to open the exhaust port at least about 30° prior to the opening of the intake port. Similarly, the exhaust port can be closed at least about 30° prior to the closing of the intake port.

A loss of fuel mixture frequently encountered in prior art two cycle internal combustion engines is thereby substantially reduced or eliminated. Moreover, since the exhaust port is closed while the intake port is still open super charging of the mixture passing into the cylinder chambers is possible. This in turn results in higher gas compressions, more powerful combustions and a greater power output for the engine. Thus, the engine of the present invention reduces both the quantity of pollutants discharged by it and fuel consumption while increasing its efficiency as compared to prior art internal combustion engines. In contrast to prior art two cycle engines as described in the aforementioned U.S. patent, the present invention, by virtue of its short stroke, relatively large diameter pistons and short connecting rods, enables the construction of engines having optimized valve timing.

The connecting rods have an imaginary center line which curves away from the axis of rotation of the crank shaft. This is achieved by concavely shaping a side of the rod proximate the crank shaft axis. The concave recess defined by the side accomodates portions of the cylinder wall which would otherwise interfere with conventionally constructed, straight connecting rods. Heretofore, such potential interference has defined the limit of relative angular inclination between the cylinder chambers, of piston stroke length and of connecting rod length and, thereby, of the maximum spacing between the bottom dead centers of the piston.

Thus, it can be seen that the present invention provides a two cycle internal combustion engine which combines the well known advantages of low cost and maintenance of such engines with high performance, a low weight to horse power ratio and an engine efficiency heretofore not attainable with two cycle engines.

DESCRIPTION OF THE PREFERRED EMBODIMENTS

Figure 1:
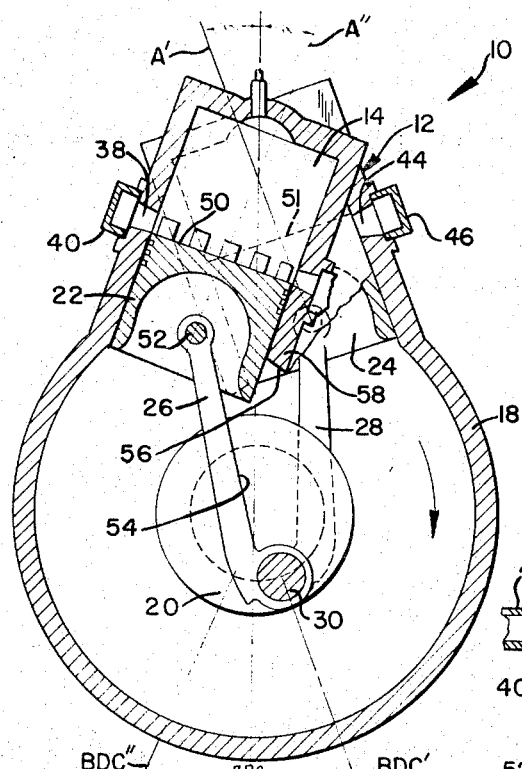
FIG. 1 is a side elevational view, with parts broken away, of a two cycle internal combustion engine constructed in accordance with the present invention and having interconnected cylinder chambers angularly offset with respect to each other by about 40°.
Figure 2:
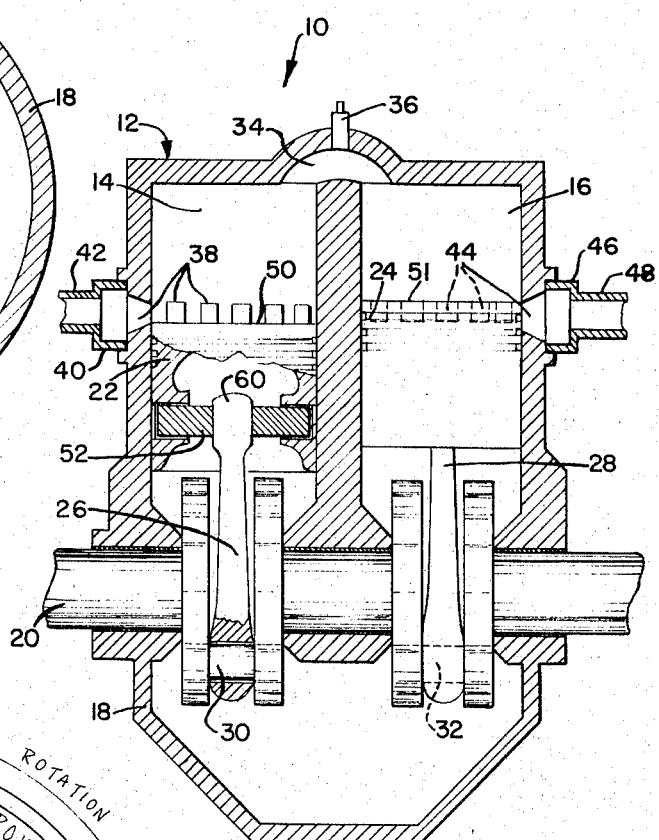
FIG. 2 is a side elevational view, in section, of the two cycle engine illustrated in FIG. 1 and is taken in planes parallel to the axes of each cylinder chamber and the center lines of connecting rods interconnecting the pistons with the crank shaft throw.

Referring to FIGS. 1 and 2, a two cycle internal combustion engine 10 constructed in accordance with the invention broadly comprises a cylinder 12 having a pair of interconnected, angularly offset piston chambers 14 and 16, a motor block 18 mounting the cylinders, a crank shaft 20 journaled in the motor block, pistons 22 and 24 in chambers 14 and 16, respectively, and connecting rods 26 and 28 securing the pistons to crank shaft throws 30 and 32. Axes A' and A" of piston chambers 14 and 16, respectively, are inclined from the vertical by an angle $\alpha$ and with respect to each other by an angle of $2\alpha$. A passage 34 interconnects the upper ends of the cylinder chambers, permits the cross travel of gas between the chambers and enables the simultaneous firing of both chambers with a spark plug 36 mounted to the cylinder and extending into the passageway.

Assuming a clockwise rotation of the engine as illustrated by the arrow in FIG. 1, piston 22 is the leading piston, that is it reaches its bottom dead center BDC' first while piston 24 is the trailing piston which reaches its bottom dead center BDC" subsequently as illustrated in FIG. 1. A port 38 in the cylinder terminates in cylinder chamber 14 and is opened and closed by the leading piston. The port defines the exhaust port of the engine and leads into a manifold 40 from which a pipe 42 passes exhaust gas to a muffler (not shown) or the like.

Another port 44 in cylinder 12 terminates in cylinder chamber 16 and forms the intake port for the engine. It is connected to an intake manifold 46 which in turn receives a fuel-air mixture from a carburetor or a super charger (not shown) via an intake conduit 48.

Crank shaft throws 30 and 32 are aligned, that is they are equally spaced from the axis of rotation of the crank shaft and are in angularly identical positions so that when the throws are at their top dead center, pistons 22 and 24 are substantially at their top dead centers also. The term "substantially" is used herein to denote that there is normally a slight time lag of one or two degrees within which the two pistons in the angularly inclined cylinder chambers reach their respective top dead centers. For practical considerations, however, that difference can be ignored.

Figure 5:
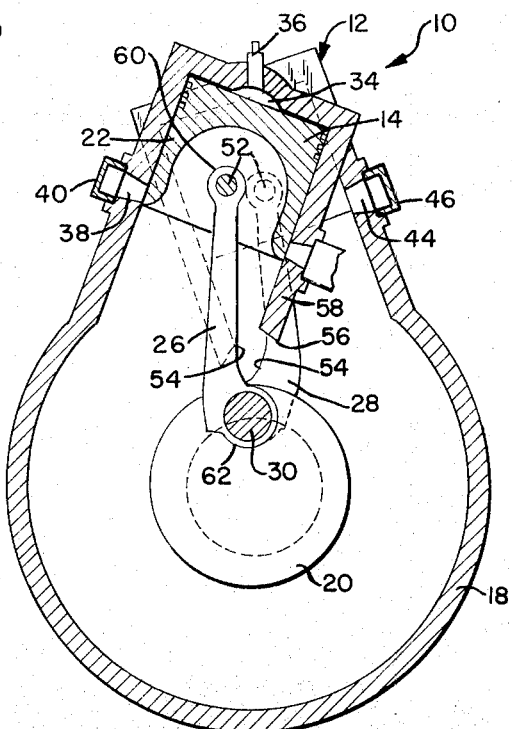
FIG. 5 is a side elevational view, in section, similar to FIG. 1 but illustrates the crank shaft in the top dead center position.

As the crank shaft rotates, in a counterclockwise direction as viewed in FIG. 1, from the position in which the crank shaft throws are at top dead center (illustrated in FIG. 5), piston 22 is ahead of piston 24. Exhaust port 38 is so positioned that it is opened first when piston top 50 moves past the upper port edge. Thereafter, top 51 of piston 24 moves past the upper intake port edge. Thus, exhaust gas can be discharged from cylinder chambers 14 and 16 before fresh fuel-air mixture is introduced.

After the exhaust port has been opened for the desired length of time, as more fully described hereinafter, trailing piston 24 opens intake port 44 for the introduction of a fresh mixture into the cylinder chambers. Leading piston 22 also leads trailing piston 24 during the upward stroke of the pistons from their respective bottom dead centers to their top dead centers. Consequently, top surface 50 of leading piston 22 closes exhaust port 38 before top surface 51 of trailing piston 24 closes the intake ports. Thus, after the exhaust port has been closed, fresh mixture, which may now be pressurized above atmospheric pressure via a super charger or the like, continues to fill the cylinder chambers 14, 16 without loss of fresh mixture passing out of the chambers through an open exhaust port as was common in prior art engines. The intake port is closed after it has remained open for the desired length of time, as more fully described hereinafter, past the closing of the exhaust port by the movement of trailing piston top surface 51 past the upper edge of the intake port. Further movement of the pistons towards their top center compresses the fresh mixture within the chambers until they arrive at their top dead center. Spark plug 36 is now fired and the engine's power stroke follows. It terminates upon the opening of exhaust port 38 as above described.

Figure 3:
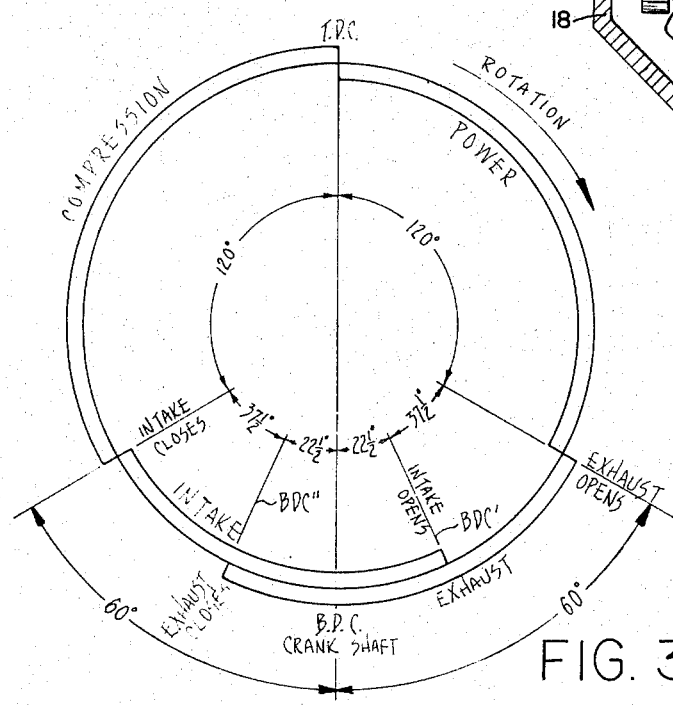
FIG. 3 is a timing diagram for a complete cycle of the two cycle engine of the present invention and illustrates the relative durations of the compression stroke, the power stroke, the exhaust time and the intake time.
Figure 4:
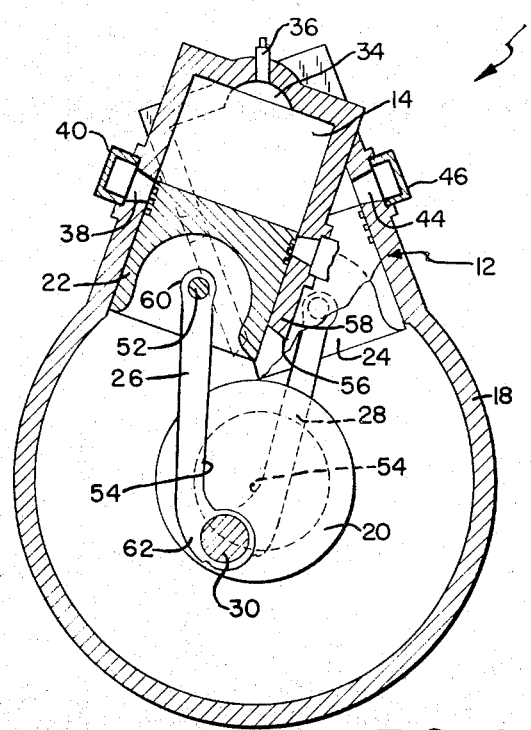
FIG. 4 is a view similar to FIG. 1 but illustrates the crank shaft at the bottom dead center for the trailing piston.

Referring now to FIGS. 1 through 3, a complete engine cycle, that is one crank shaft rotation through 360° is conventionally divided into three sections. The power stroke lasting from top dead center of the piston to a point intermediate the top and bottom dead center; the exhaust-intake stroke commencing with the end of the power stroke by opening the exhaust port and permitting a substantially instantaneous pressure drop in the cylinder chambers and which terminates when the cylinder chambers are again completely sealed from the exterior; and the compression stroke which commences upon the closing of the ports and lasts until the pistons arrive at their top dead center.

Figure 7:
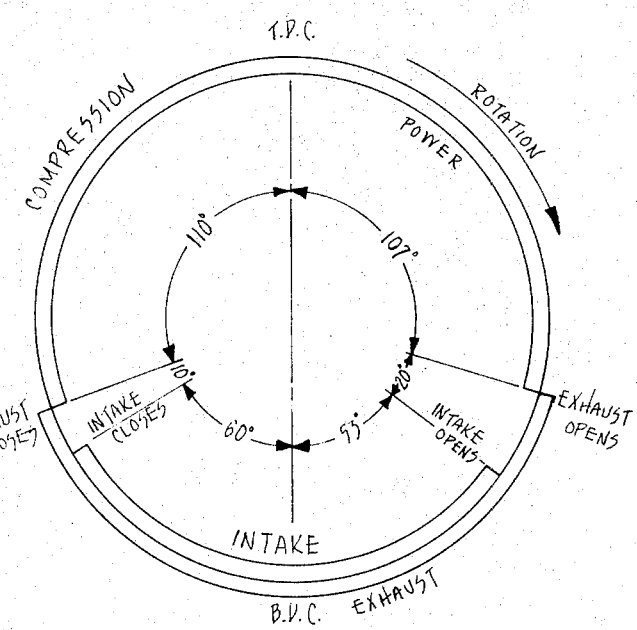
FIG. 7 is a schematic time diagram similar to FIG. 3 for the prior art engine illustrated in FIG. 6.

Referring briefly to FIG. 7, in a conventional two cycle engine the exhaust-intake stroke begins and terminates with the opening and closing, respectively, of the exhaust ports. The intake port is opened for the same length of time, expressed in degrees of crank shaft rotation, on each side of the bottom dead center of the piston and the crank shaft. In the above referenced U.S. patent, the exhaust-intake stroke will usually still terminate with the opening and closing of the exhaust ports. However, the opening and closing of the intake port is no longer symmetric with respect to the bottom dead center of the crank shaft but is shifted to the left, as viewed in FIG. 7, so that the intake ports remain open until just shortly prior to the closing of the exhaust port while the intake port opens substantially later than the exhaust port to facilitate the discharge of exhaust gases from the cylinder.

Referring to FIGS. 1 and 3, the timing diagram for a two cycle internal combustion engine ideally looks as follows. Each of the power, exhaust-intake, and compression strokes is of approximately equal duration about 120° of a crank shaft rotation and the exhaust port opens about 30° to 45° before the intake port opens. Similarly, the exhaust port closes about 30° to 45° prior to the closing of the intake port to assure complete filling of the cylinder chamber with fresh mixture and to enable, where desired, the super charging of the mixture. Thus, the intake port opens at about the time the leading piston reaches bottom dead center and the exhaust port closes at about the time the trailing piston reaches bottom dead center.

Figure 6:
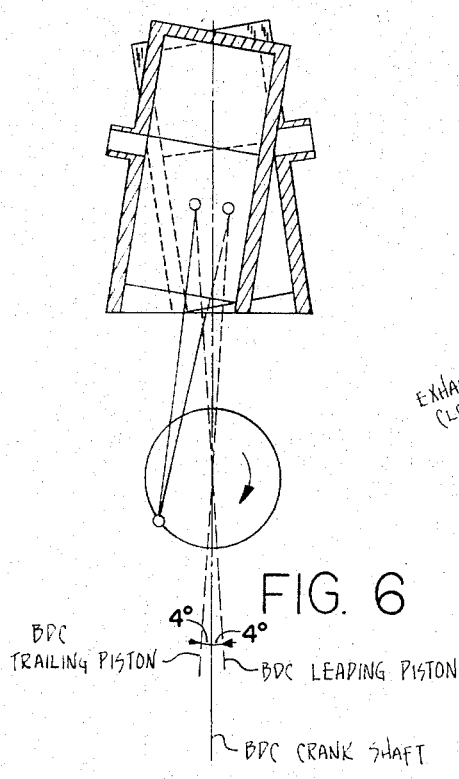
FIG. 6 is a schematic side elevation illustrating a piston phase shift of a two cycle internal combustion engine constructed in accordance with the prior art.

The prior art engine described in the above referenced patent and schematically illustrated in FIG. 6 cannot attain the ideal timing distribution and particularly the ideal timing of the exhaust and intake valving. This is inherent in such an engine because of its long stroke and connecting rods as well as the relatively small inclination of the cylinder chamber axes. Consequently, it is impossible to substantially separate the bottom dead centers of the pistons. However, ideally, the bottom dead center spacing is between about 30° to 45°. For practical purposes, this requires an inclination of the cylinder axes A' and A'' of at least about 20° and preferably about 40° so that the angle $\alpha$ of each chamber axis from the vertical is at least about 10° and preferably about 20°, although good results are attained whenever the angle falls in the 10° to 20° range. Greater angular inclinations can be made to further shift the exhaust and intake ports opening and closing should that be desired.

Referring to FIGS. 1 through 5, the desired relatively large angular spacing between the bottom dead center of the pistons further requires relatively short pistons, preferably within the above described range, and a short stroke engine, that is one in which the distance between the piston top dead center and the bottom dead center is no more and preferably less than the piston diameter. Conversely, the pitch diameter of the axes of crank shaft throws 30, 32 is no greater and preferably less than the piston diameter.

To prevent interference between downwardly extending cylinder walls 58 and the connecting rods, the latter are not straight, as are conventional rods, but slightly curved, that is the imaginary center line of the rods between the axes of crank throws 30, 32 and the axes of connecting pins 52 curves away from the axis of rotation of the crank shaft. This is obtained by shaping sides 54 of the rod facing the crank shaft center concavely away from the crank shaft to define a recess which accomodates a lower end 56 of cylinder wall 58 because the relative position of the lower wall end is substantially vertically above the crank shaft center due to the relatively large angular inclination of the piston chambers 14, 16 from the vertical. As can best be seen in FIG. 5, the connecting rod recess defined by rod sides 54, together with the relatively short stroke length of the pistons provide sufficient clearance to prevent an interference with the lower end 56 of wall 58. Eyes 60 and 62 of the connecting rod are conventionally constructed to releasably secure the rods to the connecting pins and crank shaft throws, respectively.

It will be clear that variations in the relative timings of the compression, power and exhaust-intake strokes, as well as in the relative timing between the opening and closing of the exhaust and intake ports can be made to suit particular applications of the engine. The latter includes changing the relative positioning of the upper edges of the intake and/or the exhaust ports. Moreover, as already mentioned, the fresh mixture can be super charged to enhance the power output of the engine and various sturctural modifications of the engine which do not affect the present invention can be made. For example, the engine may be constructed as a water or an air cooled engine, a plurality of cylinders each containing two cylinder chambers and dual pistons constructed in accordance with the invention can be joined in a row or a "V" configuration to increase the overall engine power output. The engine can further be operated as a Diesel or an Otto engine. In the former case, spark plug 36 illustrated in the drawings is replaced with a suitable fuel injector and air only, which may be super charged, enters the cylinder chambers through the intake ports of the cylinders. Such variations in the design of the engine are within the purview of those skilled in the art and are, therefore, not further described herein.

I claim:

1. A two cycle engine for sequentially opening and closing, respectively exhaust and intake ports of the engine to permit increased fuel-air mixture and compressions and reduce the discharge of non-combusted materials, the engine comprising: at least one cylinder having dual piston chambers and longitudinal cylinder axes symmetrically arranged about a centerline and angularly inclined with respect to each other by at least about 30°, the cylinder including means interconnecting the piston chambers for a gas interchange between the chambers and the simultaneous firing of the mixture in the chambers, a piston disposed in each chamber, a crank shaft having a center intersecting and perpendicular to the centerline and including a connecting throw for each cylinder, the crank shaft connecting throws being aligned with each other for substantially simultaneously positioning each piston at the top dead center, and connecting rods between the pistons and the crank shaft throws, said connecting rods having a length no more than about 2.1 times the diameter of the pistons, the pitch diameter of the crank shaft throw being no greater than the piston diameter to limit the axial piston travel and prevent interferences between cylinder walls and the connecting rods due to the angular inclination of the cylinder chambers, the cylinder including an exhaust port extending from one of the chambers and an intake port extending from the other one of the chambers, the exhaust port being positioned so that it opens prior to the opening of the intake port and so that it closes prior to the closing of the intake port.

2. An engine according to claim 1 wherein the connecting rod has a length no more than about 1.7 times the diameter of the piston.

3. An engine according to claim 1 wherein each of the exhaust port and the intake port only is open during at least about 25 percent of the total time during which either one or both of the ports are open during a complete engine cycle.

4. An engine according to claim 1 wherein a complete engine cycle comprises an intake and exhaust stroke during which either one or both of the intake and exhaust ports are open, a compression stroke terminating when the pistons are at their top dead center position and a power stroke commencing at the top dead center and terminating upon the opening of the exhaust port, and wherein the strokes are of substantially the same duration.

5. An engine according to claim 4 wherein the intake and exhaust stroke comprises an exhaust period during which the exhaust port is opened and which commences with the end of the power stroke and lasts at least until each piston has reached its bottom dead center, and wherein the intake valve is open from at least the time one of the pistons reaches its bottom dead center until the commencement of the compression stroke and until after the closure of the exhaust port.

6. An engine according to claim 4 wherein periods during which the exhaust and intake ports are open substantially equally overlap the bottom dead centers of the respective pistons.

7. An engine according to claim 5 wherein the intake port remains open for at least about 30° of one crank shaft rotation after the exhaust port is closed.

8. A high efficiency two cycle internal combustion engine permitting the super charging of the fuel-air mixture to enhance power output while minimizing the exhaust of pollutants without the provision of special valves and the like, the engine comprising: first and second cylinders having axes that are angularly offset with respect to each other, a combustion chamber interconnecting the cylinders to permit a gas flow between the cylinders and for the simultaneous firing of the mixture in the cylinders, a crank shaft including aligned crank shaft throws, a piston in each cylinder, the pistons having diameters at least about equal to the pitch diameter of the crank shaft throw, rods connecting the pistons and the throws so that the pistons are substantially simultaneously at top dead center, the rods having a length so that bottom dead centers of the pistons are spaced apart at least about 30° of one crank shaft revolution, a side of the rods proximate the crank shaft axis being concavely recessed away from the crank shaft axis to prevent interference between the rod and cylinder walls during operation of the engine, whereby the pistons arrive as a leading piston and a trailing piston at their respective bottom dead centers sequentially as a function of the angular inclination of the cylinder axes and of the rod lengths, the cylinder within which the leading piston is disposed including an exhaust port and the cylinder within which the trailing piston is disposed including an intake port, the exhaust port being positioned so that the leading piston opens it before the trailing piston opens the intake port, whereby the leading piston closes the exhaust port before the trailing piston closes the intake port to prevent the escape of fuel-air mixture through the exhaust port during the compression stroke of the engine and thereby reduce air pollution caused by the engine and increase the engine efficiency and power output.

9. An engine according to claim 8 wherein the angle between the cylinder axes and the relative positioning of the exhaust port and the intake port retains the intake port open for a crank shaft rotation of at least about 30° after closure of the exhaust port.

10. An engine according to claim 8 wherein the cylinder axes are offset with respect to each other by an angle between about 20° to about 45°.

11. An engine according to claim 10 wherein the rod length is no more than about 2.1 times the diameter of the pistons.

* * * * *